(12) United States Patent
Chae

(10) Patent No.: US 7,385,661 B2
(45) Date of Patent: Jun. 10, 2008

(54) IN-PLANE SWITCHING MODE LIQUID CRYSTAL DISPLAY DEVICE AND METHOD OF MANUFACTURING THE SAME

(75) Inventor: Geo Sung Chae, Incheon-kwangyokshi (KR)

(73) Assignee: LG Displays Co., Ltd., Seoul (KR)

( * ) Notice: Subject to any disclaimer, the term of this patent is extended or adjusted under 35 U.S.C. 154(b) by 0 days.

(21) Appl. No.: 10/860,282

(22) Filed: Jun. 4, 2004

(65) Prior Publication Data
US 2004/0257510 A1    Dec. 23, 2004

(30) Foreign Application Priority Data
Jun. 17, 2003    (KR) .................... 10-2003-0039155

(51) Int. Cl.
*G02F 1/1343*    (2006.01)
(52) U.S. Cl. ..................................... 349/141; 349/138
(58) Field of Classification Search .............. 349/141, 349/114, 113, 138
See application file for complete search history.

(56) References Cited

U.S. PATENT DOCUMENTS

| | | | | |
|---|---|---|---|---|
| 6,034,747 | A * | 3/2000 | Tanaka et al. ................. | 349/43 |
| 6,177,970 | B1 * | 1/2001 | Kim ............................. | 349/43 |
| 6,307,611 | B1 * | 10/2001 | Kim et al. ................... | 349/138 |
| 6,476,895 | B1 * | 11/2002 | Kwak et al. ................. | 349/123 |
| 6,583,840 | B1 * | 6/2003 | Inoue et al. ................. | 349/141 |
| 6,744,482 | B2 * | 6/2004 | Matsumoto et al. ........ | 349/141 |
| 2002/0057411 | A1 | 5/2002 | Kim et al. | |
| 2002/0158994 | A1 | 10/2002 | Hashimoto et al. | |

FOREIGN PATENT DOCUMENTS

| | | |
|---|---|---|
| JP | 2000-089240 A | 3/2000 |
| JP | 2003-098513 A | 4/2003 |
| KR | 2002-81133 | 10/2002 |
| KR | 2003-21089 | 3/2003 |

OTHER PUBLICATIONS

Communication from Chinese Patent Office dated May 26, 2006.

* cited by examiner

*Primary Examiner*—David Nelms
*Assistant Examiner*—Richard H Kim
(74) *Attorney, Agent, or Firm*—McKenna Long & Aldridge LLP

(57) ABSTRACT

An in-plane switching mode liquid crystal display device includes a plurality of gate and data lines on a substrate that cross each other to define a pixel region, a thin film transistor at a crossing of the plurality of gate and data lines, an organic insulating layer over the substrate including the thin film transistor, and having a step difference in the pixel region, common electrodes on the organic insulating layer above the data lines, and pixel electrodes positioned between the common electrodes.

9 Claims, 12 Drawing Sheets

IN-PLANE SWITCHING MODE LIQUID CRYSTAL DISPLAY DEVICE AND METHOD OF MANUFACTURING THE SAME

This application claims the benefit of the Korean Application No. P2003-39155 filed on Jun. 17, 2003, which is hereby incorporated by reference.

BACKGROUND OF THE INVENTION

1. Field of the Invention

The present invention relates to a liquid crystal display (LCD) device, and more particularly, to an In-Plane Switching (IPS) mode liquid crystal display (LCD) device and a method of manufacturing the same.

2. Discussion of the Related Art

Demands for various display devices have increased as the information society has developed. Accordingly, many efforts have been made to research and develop various types of flat display devices, such as liquid crystal display (LCD), plasma display panel (PDP), electroluminescent display (ELD), and vacuum fluorescent display (VFD). Some types of flat display devices have already been used as displays in a variety of different applications. Among the various flat display devices, liquid crystal display (LCD) devices have been most widely used due to the advantageous characteristics of thin profile, light weight, and low power consumption. LCD devices have been provided as a substitute for a Cathode Ray Tube (CRT) in many applications. In addition, mobile type LCD devices, such as a display for a notebook computer, have been developed. Further, LCD devices can be used as computer monitors, televisions or other types of equipment that display video.

Various technical developments an research in LCD technology has been ongoing. However, the picture quality is still, in some respects, lacking as compared to other features and advantages of the LCD device. In order to use LCD devices in various fields as a general display, the key to developing LCD devices depends on whether LCD devices can implement a high quality picture, such as a high resolution and high luminance large-sized screen, while still maintaining light weight, thin profile, and low power consumption.

In general, an LCD device includes an LCD panel for displaying a picture image, and a driving part for applying a driving signal to the LCD panel. The LCD panel includes first and second glass substrates bonded to each other with a predetermined gap therebetween. A liquid crystal layer is injected into the gap between the first and second glass substrates.

The first glass substrate (TFT array substrate) includes a plurality of gate and data lines, a plurality of pixel electrodes, and a plurality of thin film transistors. The plurality of gate lines are formed on the first glass substrate at fixed intervals, and the plurality of data lines are formed perpendicular to the plurality of gate lines at fixed intervals. The plurality of pixel electrodes, arranged in a matrix-type configuration, are respectively formed in pixel regions defined by the plurality of gate and data lines that cross each other. The plurality of thin film transistors are switched according to signals from the gate lines to transmit signals of the data lines to the respective pixel electrodes.

The second glass substrate (color filter substrate) includes a black matrix layer that excludes light from regions except for the pixel regions of the first substrate. The second glass substrate also includes an R/G/B color filter layer for displaying various colors. Further, a common electrode can be positioned on the second glass substrate. However, in the case of an In-Plane switching mode LCD device, the common electrode is formed on the first glass substrate.

The gap between the first and second glass substrates is maintained by spacers when the first and second substrates are bonded to each other by a seal pattern having a liquid crystal injection inlet. The liquid crystal layer is formed using a liquid crystal injection method, in which the liquid crystal injection inlet is dipped into a container having liquid crystal while a vacuum state is maintained in the gap between the first and second glass substrates. That is, the liquid crystal is injected between the first and second substrates by an osmotic action. Subsequently, the liquid crystal injection inlet is sealed with a sealant.

A LCD device is driven according to the optical anisotropy and polarizability of liquid crystal. Liquid crystal molecules can impart directional characteristics on light because liquid crystal molecules have long and thin shapes. The directional characteristics of the liquid crystal molecules can be controlled by inducing electric field across the liquid crystal in the direction of an alignment direction for the liquid crystal molecules. That is, if the alignment direction of the liquid crystal molecules is controlled by the induced electric field, the direction of polarized light can be changed by the optical anisotropy of the liquid crystal to thereby display a picture image.

Liquid crystal is classified into positive (+) type liquid crystal having positive dielectric anisotropy and negative (−) type liquid crystal having negative dielectric anisotropy according to electrical characteristics of the liquid crystal. In the positive (+) type liquid crystal, a longitudinal (major) axis of a positive (+) liquid crystal molecule is in parallel to the electric field applied to the liquid crystal. Meanwhile, in the negative (−) type liquid crystal, a longitudinal (major) axis of a negative (−) liquid crystal molecule is perpendicular to the electric field applied to the liquid crystal.

FIG. 1 is an exploded perspective view illustrating a Twisted Nematic (TN) mode LCD device. As shown in FIG. 1, the TN mode LCD device includes a lower substrate 1 and an upper substrate 2 bonded to each other with a gap therebetween, and a liquid crystal layer 3 in the gap between the lower and upper substrates 1 and 2.

The lower substrate 1 includes a plurality of gate lines 4, a plurality of data lines 5, a plurality of pixel electrodes 6, and a plurality of thin film transistors T. The plurality of gate lines 4 are formed on the lower substrate 1 in one direction at fixed intervals and the plurality of data lines 5 are formed perpendicular to the plurality of gate lines 4 at fixed intervals to thereby define a plurality of pixel regions P. A plurality of pixel electrodes 6 are respectively formed in the pixel regions P defined by the plurality of gate and data lines 4 and 5 that cross each other. A plurality of thin film transistors T are respectively formed at crossings of the gate and data lines 4 and 5. Next, the upper substrate 2 includes a black matrix layer 7 that excludes light from regions except for the pixel regions P, R/G/B color filter layers 8 for displaying various colors, and a common electrode 9.

Each of the thin film transistors T include a gate electrode, a gate insulating layer (not shown), an active layer, a source electrode, and a drain electrode. The gate electrode projects from the gate line 4. The gate insulating layer (not shown) is formed over an entire surface of the lower substrate. The active layer is formed on the gate insulating layer above the gate electrode. The source electrode projects from the data line 5, and the drain electrode is formed opposite to the source electrode. The aforementioned pixel electrode 6 is formed of transparent conductive metal having great transmittance, such as indium-tin-oxide (ITO).

In the aforementioned LCD device, liquid crystal molecules of the liquid crystal layer 3 on the pixel electrode 6 are aligned as a result of a signal applied through the thin film transistor T. Light transmittance is controlled according to alignment of liquid crystal to thereby display a picture image. The liquid crystal molecules by driven by an electric field perpendicular to the lower and upper substrates using the common electrode 9 of the upper substrate 2. This method obtains great transmittance and high aperture ratio. Also, it is possible to prevent liquid crystal cells from being damaged by static electricity since the common electrode 9 of the upper substrate 2 serves as the ground. However, in the case of driving the liquid crystal molecules with an electric field that is perpendicular to the lower and upper substrates, it is difficult to obtain a wide viewing angle.

In order to overcome the narrow viewing angle problem of a Twisted Nematic (TN) mode LCD device, an In-Plane switching (IPS) mode LCD device has been proposed. Hereinafter, a related art IPS mode LCD device will be described with reference FIG. 2, FIG. 3A, FIG. 3B, FIG. 4A, FIG. 4B, FIG. 5 and FIG. 6. FIG. 2 is a cross-sectional view schematically illustrating the related art In-Plane switching mode LCD device. In the related art IPS mode LCD device, as shown in FIG. 2, a common electrode 13 and a pixel electrode 12 are formed on the same plane of a lower substrate 10. Then, the lower substrate 10 is bonded to an upper substrate 20 with a gap therebetween. A liquid crystal 3 is positioned between the lower and upper substrates 10 and 20. The liquid crystal 3 is driven by an electric field between the common electrode 13 and the pixel electrode 12 on the lower substrate 10.

FIG. 3A and FIG. 3B respectively illustrate the alignment direction of liquid crystal when a voltage is turned off and turned on in the related art In-Plane switching mode LCD device.

FIG. 3A illustrates the related art IPS mode LCD device when the voltage is turned off in that no electric field is applied in parallel to the lower and upper substrates between the common electrode 13 or the pixel electrode 12. Accordingly, there is no change in alignment of the liquid crystal 3. For example, liquid crystal molecules are basically twisted at 45° to a horizontal direction of the pixel electrode 12 and the common electrode 13.

FIG. 3B illustrates the related art IPS mode LCD device when the voltage is turned on in that an electric field is applied in parallel to the lower and upper substrates between the common electrode 13 and the pixel electrode 12. Accordingly, alignment of the liquid crystal 3 is changed. In more detail, the alignment of liquid crystal 3 is twisted more at 45° as compared to the alignment of liquid crystal when the voltage is turned off. In this state, the horizontal direction of the common and pixel electrodes 13 and 12 is identical to the twisted direction of liquid crystal.

As mentioned above, the related art IPS mode LCD device has the common electrode 13 and the pixel electrode 12 on the same plane. The related art IPS mode LCD device has the advantageous characteristic of as wide viewing angle. For example, along a front direction of the IPS mode LCD device, a viewer can have a viewing angle of 70° in all directions (i.e., lower, upper, left, and right directions). Furthermore, the related art IPS mode LCD device has simplified fabrication process steps, and reduced color shift. However, the related art IPS mode LCD device has the problems of low light transmittance and low aperture ratio since the common electrode 13 and the pixel electrode 12 are formed on the same substrate. Further, the related art IPS mode LCD device also has the problems of high driving voltages to improve response times, and the need to maintain a uniform cell gap due to the small misalignment margin of the cell gap. That is, the IPS mode LCD device has the aforementioned advantages and disadvantages as compared to the Twisted Nematic (TN) mode LCD device, whereby a user can select the mode of the LCD device according to a purpose.

FIG. 4A and FIG. 4B are perspective views illustrating operation of the IPS mode LCD device while respectively in the states of being turned off and turned on. FIG. 4A is a state when a voltage is not supplied to the pixel electrode 12 or the common electrode 13 such that the alignment direction 16 of the liquid crystal molecules is identical to the alignment direction of an initial alignment layer (not shown). Then, as shown in FIG. 4B, when the voltage is supplied to the pixel electrode 12 and the common electrode 13, the alignment direction 16 of the liquid crystal molecules is corresponding to an electric field application direction 17.

FIG. 5 is a plane view illustrating a unit pixel of the related art IPS mode LCD device. FIG. 6 is a cross-sectional view taken along lines I-I' and II-II' of FIG. 5. As shown in FIG. 5 and FIG. 6, the related art IPS mode LCD device includes a transparent lower substrate 60 having a plurality of gate lines 61 and data lines 64 crossing each other to define pixel regions, and a plurality of thin film transistors T respectively where the plurality of gate lines 61 and data lines 64 cross each other. Each of the thin film transistors T includes a gate electrode 61a protruding from the gate line 61, a gate insulating layer 62 over an entire surface of the lower substrate 60 including the gate electrode 61a, an active layer on the gate insulating layer 62 above the gate electrode 61a, a source electrode 64a protruding from the data line 64, and a drain electrode positioned at a predetermined interval from the source electrode 64a. Also, a common line 61b is formed in the same layer as the gate line 61. More particularly, the common line 61b is formed in parallel to the gate line 61 within the pixel region.

A passivation layer 65 is formed over the entire surface of the lower substrate 60 including the data line 64, and a contact hole 66 is formed to expose the drain electrode 64b. The passivation layer 65 is formed of silicon nitride. Then, a common electrode 67 and a pixel electrode 68 are alternately formed on the passivation layer 65 of the pixel region in parallel. The common electrode 67 is connected to the common line 61b through the contact hole 69, and the plurality of common electrodes 67 are formed in parallel to the data line 64 within one pixel region. The pixel electrode 68 is connected to the drain electrode 64b of the thin film transistor through the contact hole 66. Both the common electrode 67 and the pixel electrode 68 are formed of transparent conductive layers.

Although not shown, an upper substrate is formed opposite to the lower substrate. The upper substrate includes color filter layers corresponding to the pixel regions of the lower substrate, and a black matrix layer for preventing light leakage on the portions except the pixel regions. At this time, the black matrix layer is formed corresponding to the portions including the gate line 61, the data line 64, the common electrode 67 adjacent to the data line 64, and the thin film transistor. Also, liquid crystal molecules positioned between the common electrode 67 and the pixel electrode 68 are aligned in the same direction as that of an electric field parallel to the substrates between the common electrode 67 and the pixel electrode 68, thereby forming one domain.

As mentioned above, the common electrode 67 and the pixel electrode 68 are formed of transparent conductive layers. Luminance is improved by using the transparent conductive layers. However, when the black matrix layer is formed on the data line 64 and the adjacent portions, it is necessary to take a margin for bonding the lower and upper substrate into consideration, thereby complicating manufacturing process steps. Also, depending on the resolution, a bonding margin can cause a decrease in luminance at the periphery of the data line 64. In other words, the black matrix layer is formed on the corresponding portion between the common electrodes 67 adjacent to the data line 64 as well as the data line 64, thereby causing a decrease of the aperture ratio and the luminance by the bonding margin.

In addition, the passivation layer is formed of silicon nitride having a thickness of approximately 0.3 µm. Such a silicon nitride thickness may result in cross-talk between the data line and the common electrode, and a deterioration of the picture quality by parasitic capacitance may also occur. Accordingly, in order to prevent cross-talk problem and problems of parasitic capacitance, an organic insulating layer having a low dielectric constant is formed over the entire surface of the lower substrate instead of a silicon nitride passivation layer. However, such an an organic insulating layer may cause the problem of decreased light transmission efficiency due to the thick organic insulating layer. That is, while the silicon nitride layer is formed having a thickness of approximately 0.3 µm, the organic insulating layer is formed having a thickness of approximately 3 µm, so that the light transmission efficiency of the pixel region is lowered to approximately 92% by approximately a 8% light transmission efficiency decrease.

SUMMARY OF THE INVENTION

Accordingly, the present invention is directed to an In-Plane Switching (IPS) mode liquid crystal display (LCD) device and a method of manufacturing the same that substantially obviates one or more problems due to limitations and disadvantages of the related art.

An object of the present invention is to provide an In-Plane Switching (IPS) mode liquid crystal display (LCD) device and a method of manufacturing the same, to prevent the decrease of aperture ratio and luminance by a margin for bonding lower and upper substrates.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an in-plane switching mode liquid crystal display device includes a plurality of gate and data lines on a substrate that cross each other to define a pixel region, a thin film transistor at a crossing of the plurality of gate and data lines, an organic insulating layer over the substrate including the thin film transistor, and having a step difference in the pixel region, common electrodes on the organic insulating layer above the data lines, and pixel electrodes positioned between the common electrodes.

In another aspect, a method of manufacturing an in-plane switching mode liquid crystal display device includes the steps of: forming a plurality of gate lines in one direction on a substrate; forming a gate insulating layer over the substrate including the gate lines; forming a plurality of data lines on the gate insulating layer perpendicular to the gate lines to define a plurality of pixel regions, simultaneously, forming source/drain electrodes for a thin film transistor; forming an organic insulating layer over the substrate, including the thin film transistor, with a step difference in the pixel region; forming common electrodes on the organic insulating layer above the data lines in the pixel region; and forming pixel electrodes between the common electrodes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 4A and FIG. 4B are perspective views illustrating operation of the IPS mode LCD device while respectively in the states of being turned off and turned on.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts. Hereinafter, an In-Plane Switching (IPS) mode liquid crystal display (LCD) device according to the invention and a method of manufacturing the same will be described with reference to the accompanying drawings.

Figure 1:
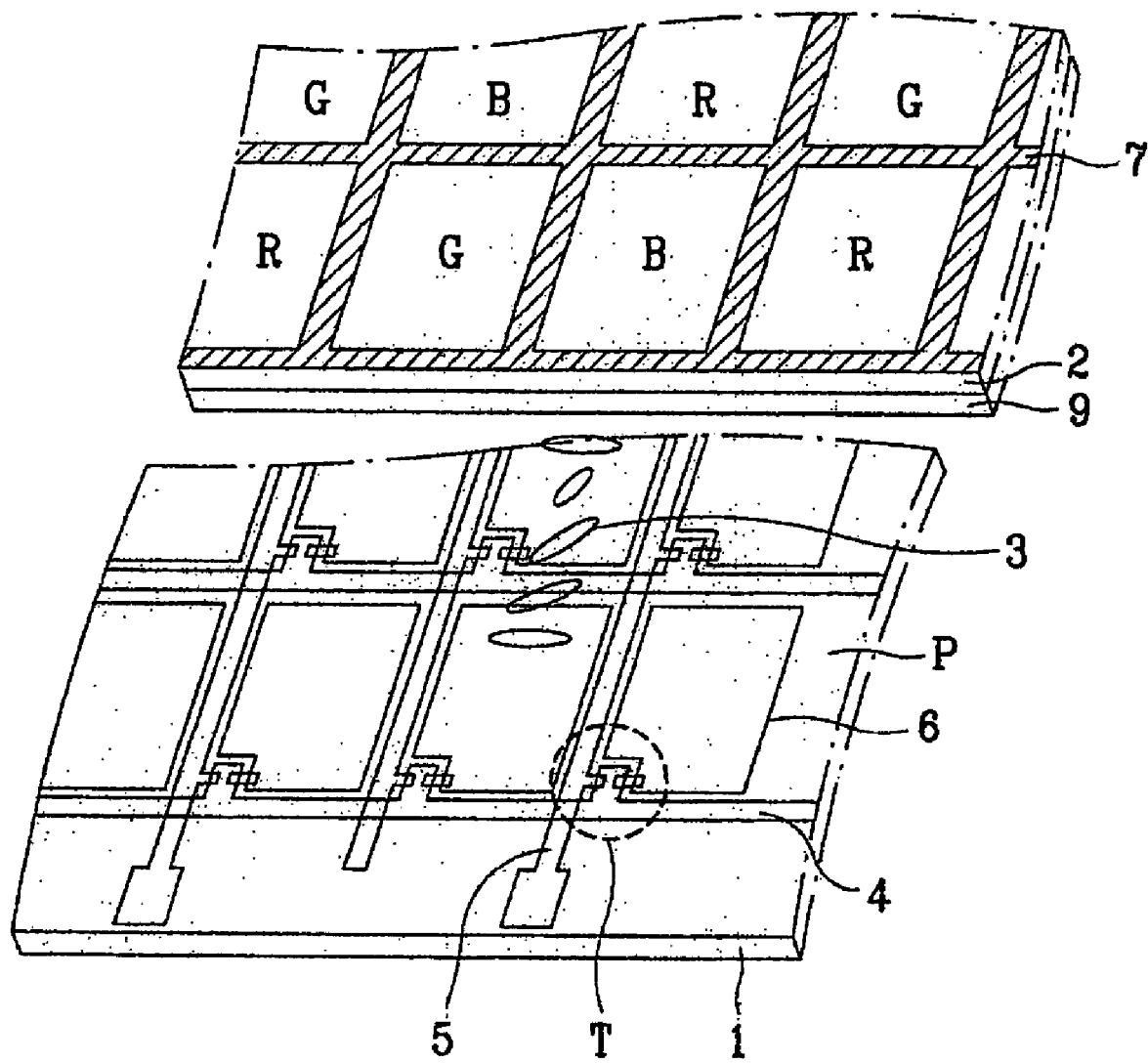
FIG. 1 is an exploded perspective view illustrating a general Twisted Nematic (TN) mode LCD device.
Figure 2:
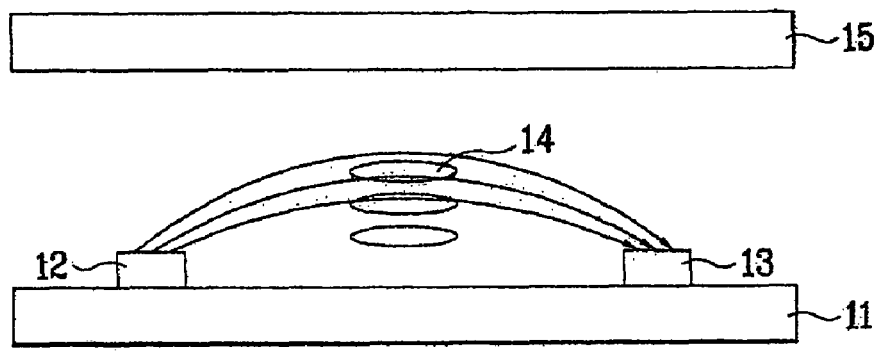
FIG. 2 is a cross-sectional view schematically illustrating an electric field and an alignment direction of liquid crystal in a general In-Plane switching (IPS) mode LCD device.
Figure 3A:
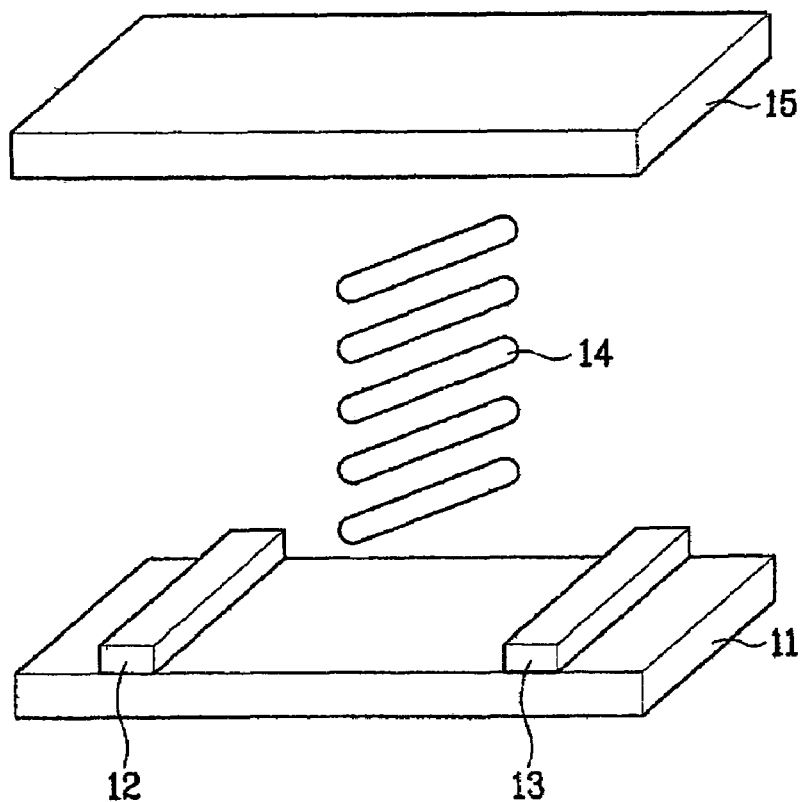
FIG. 3A and FIG. 3B respectively illustrate the alignment direction of liquid crystal when a voltage is turned off and turned on in the related art In-Plane switching mode LCD device.
Figure 3B:
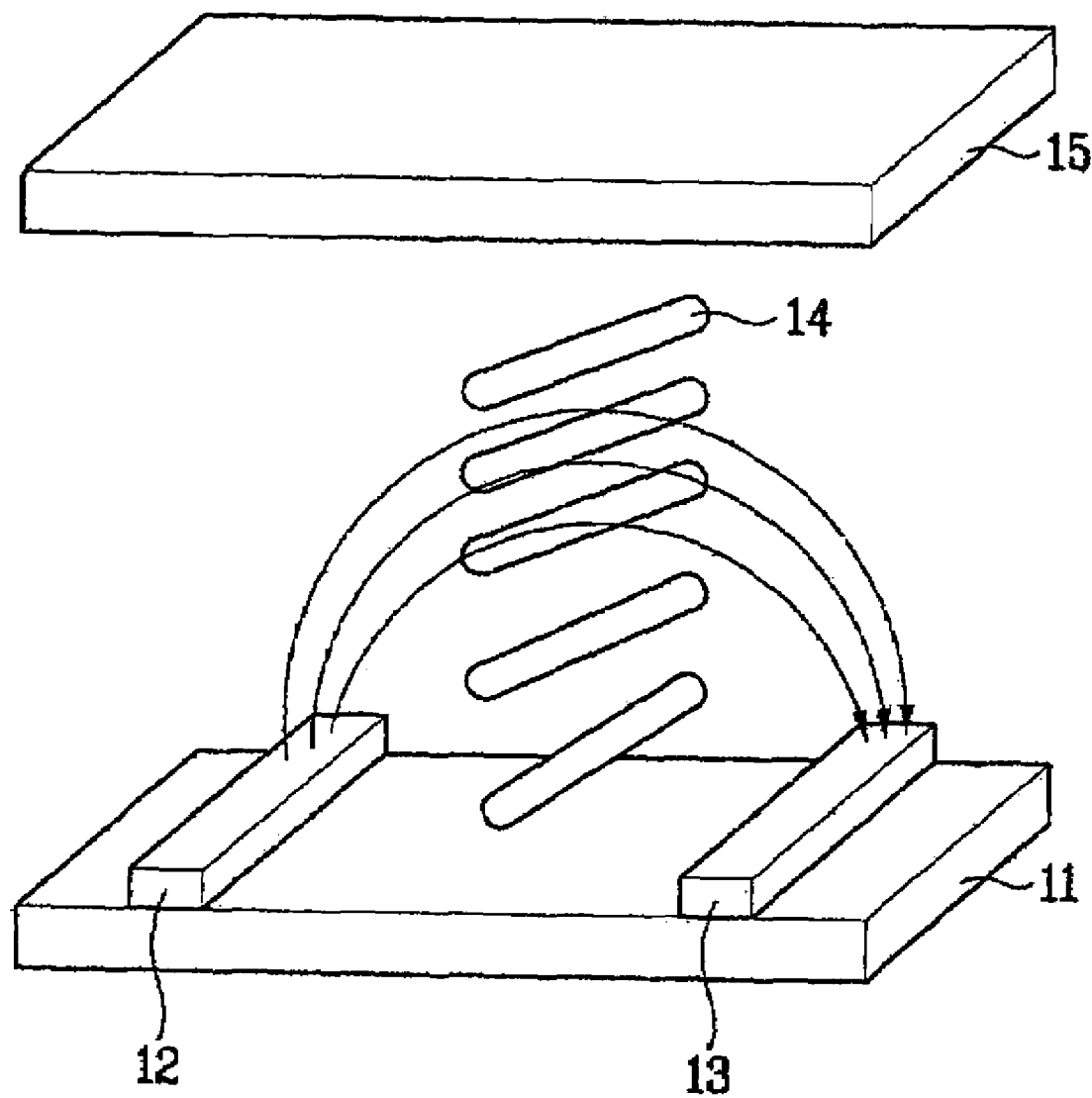
Figure 4A:
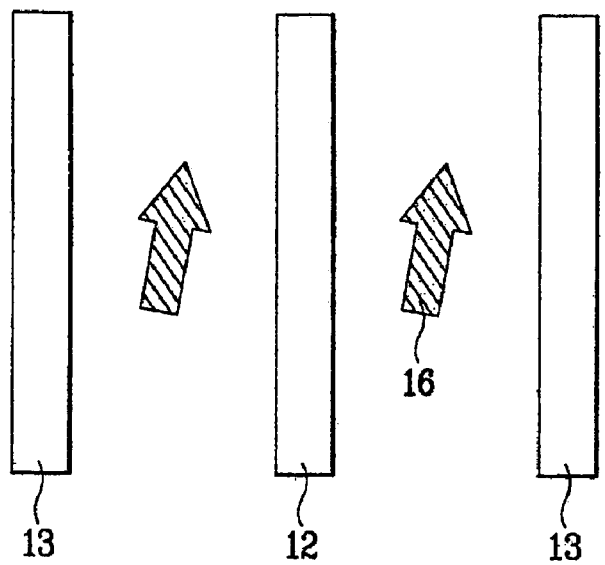
Figure 4B:
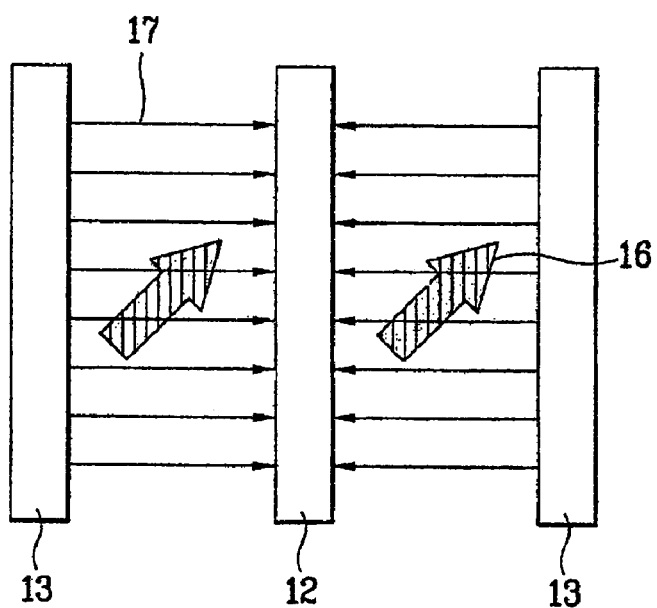
Figure 5:
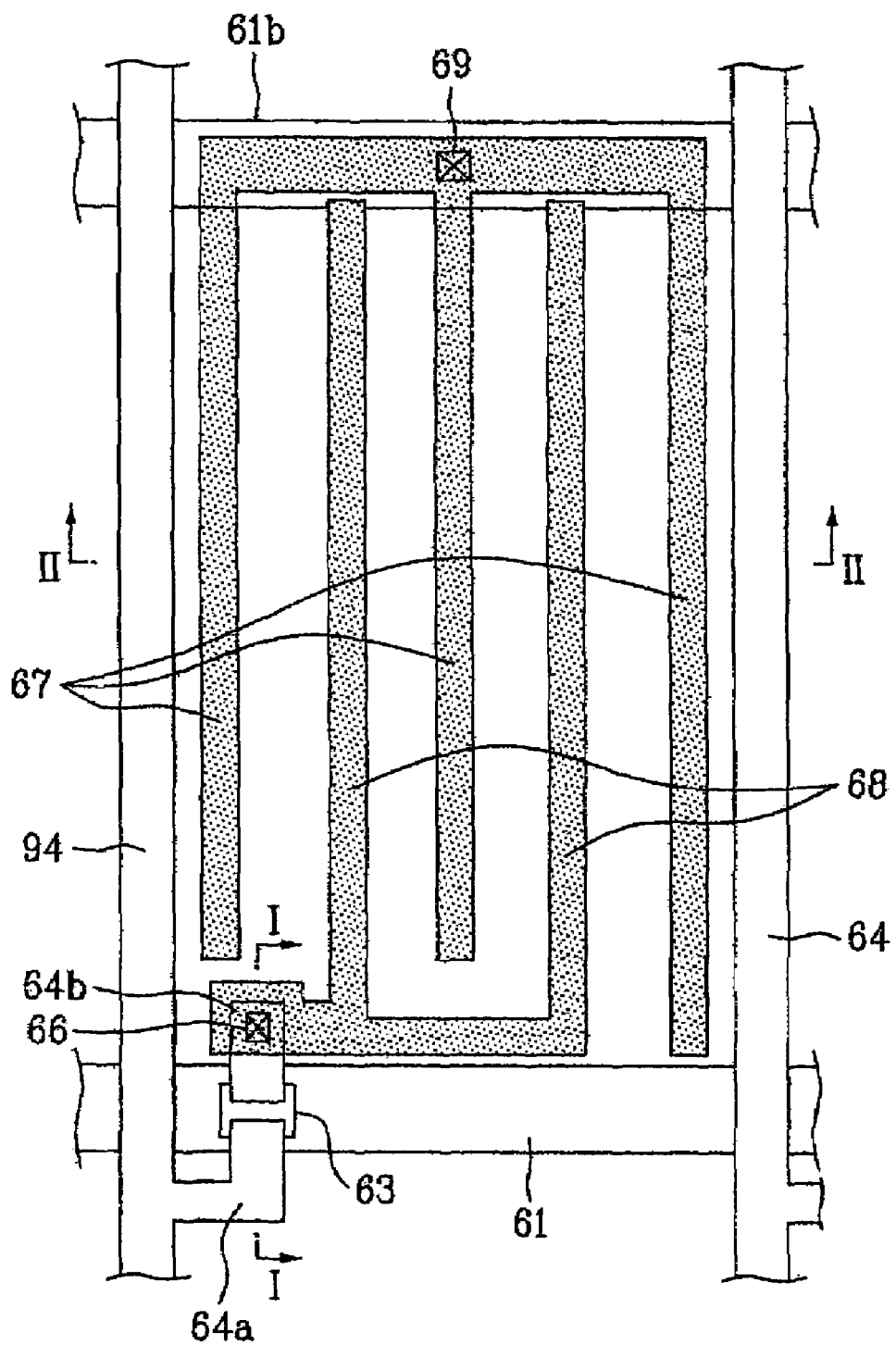
FIG. 5 is a plane view illustrating a unit pixel of a related art IPS mode LCD device.
Figure 6:
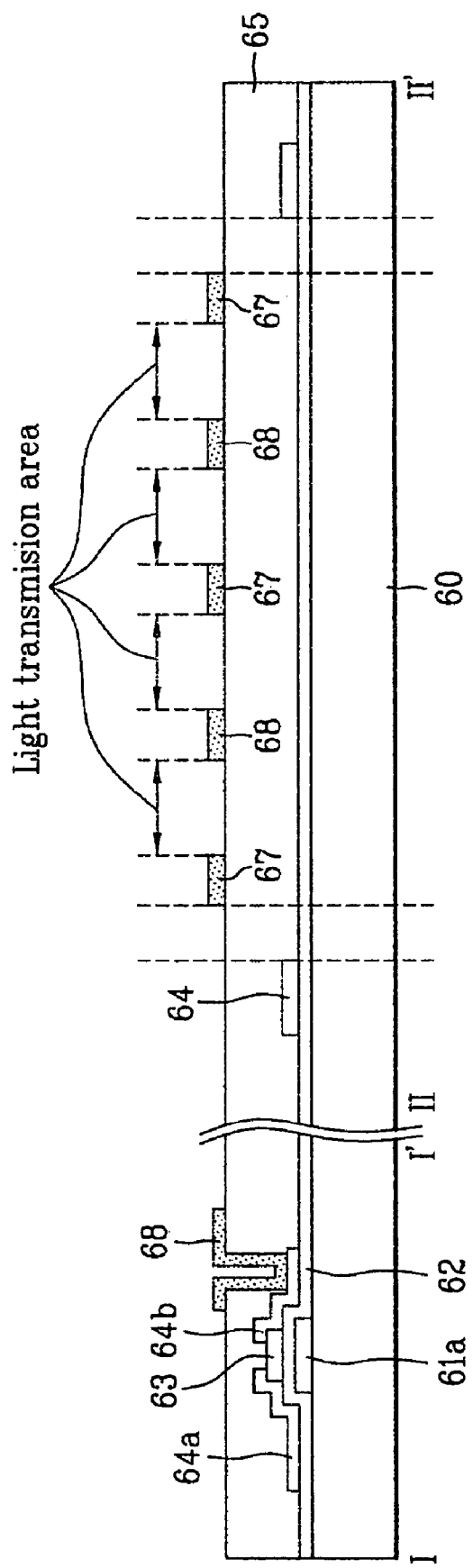
FIG. 6 is a cross-sectional view taken along lines I-I' and II-II' of FIG. 5.
Figure 7:
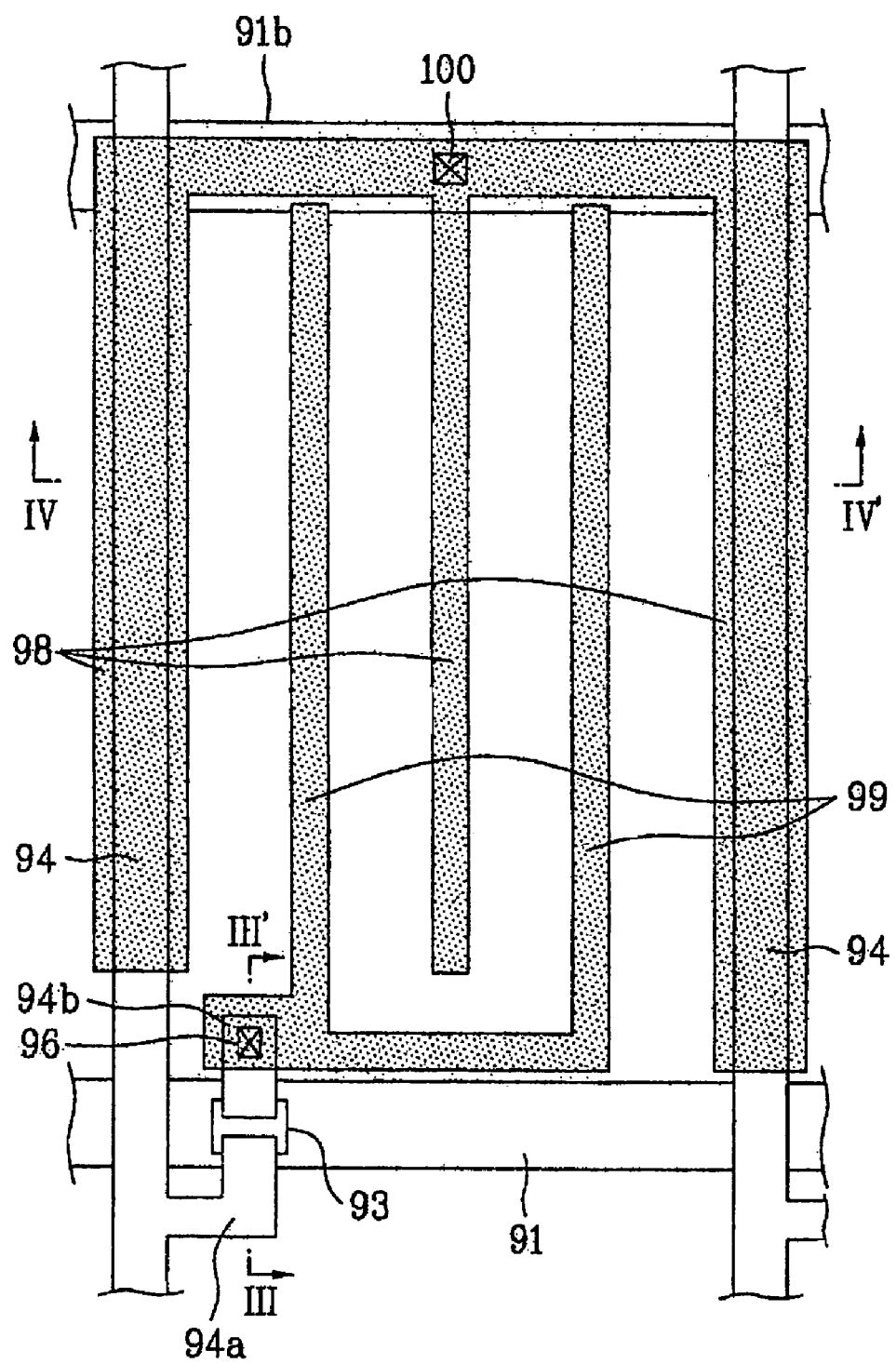
FIG. 7 is a plane view illustrating a unit pixel of an IPS mode LCD device according to an embodiment of the invention.
Figure 8:
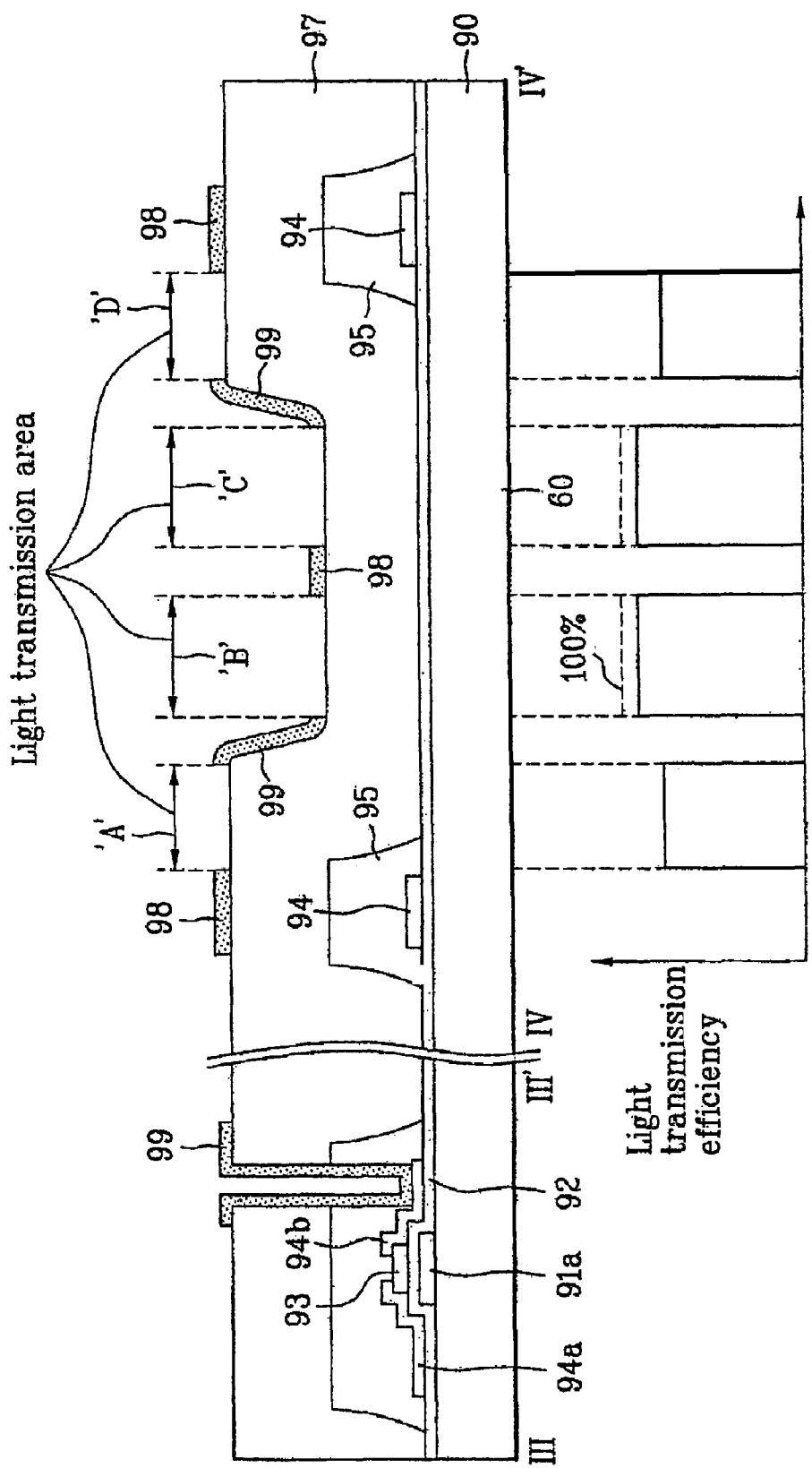
FIG. 8 is a cross-sectional view taken along lines III-III' and IV-IV' of FIG. 7, and a bar graph illustrating light transmittance of light transmission areas.

FIG. 7 is a plane view illustrating a unit pixel of an IPS mode LCD device according to an embodiment of the invention. FIG. 8 is a cross-sectional view taken along lines III-III' and IV-IV' of FIG. 7. The IPS mode LCD device according to embodiments of the invention includes transparent lower and upper substrates. The transparent lower substrate (TFT substrate) includes a gate line, a data line, a thin film transistor, a common line, a common electrode and a pixel electrode. The transparent upper substrate (color filter substrate) includes R/G/B color filter layers and a black matrix layer.

As shown in FIG. 7 and FIG. 8, a plurality of gate lines 91 and common lines 91b are formed in parallel on the transparent lower substrate 90. Then, a gate insulating layer 92 is formed over an entire surface of the lower substrate 90 including the gate lines 91 and common lines 91b. Also, the data lines 94 are formed on the gate insulating layer 92 in perpendicular to the gate lines 91 to define a plurality of pixel regions. A plurality of thin film transistors TFT are respectively formed at respective crossings of the plurality of gate lines 91 and data lines 94. Each of the thin film transistors TFT includes a gate electrode 91a that is a portion of the gate line 91, a gate insulating layer 92 over the entire surface of the lower substrate 90 including the gate line 91, an active layer 93 on the gate insulating layer 92 above the gate electrode 91a, a source electrode 94a protruding from the data line 94 overlapping with one side of the active layer 93, and a drain electrode 94b overlapping the other side of the active layer 93 at a predetermined interval from the source electrode 94a.

Although not shown, the gate electrode of the thin film transistor TFT may protrude from a portion of the gate line. Also, a first organic insulating layer 95 is formed over portions of the lower substrate 90 including the thin film transistors TFT and the data lines 94 except for the pixel regions. The first organic insulating layer 95 is formed of a material having a low dielectric constant in a range of approximately 3 to 4. A second organic insulating layer 97 is then formed over the entire surface of the lower substrate 90 including the first organic insulating layer 95. The second organic insulating layer 97 is formed of a material having a low dielectric constant in a range of approximately 3 to 4. The first organic insulating layer 95 is not formed in the pixel regions so that the total thickness of the organic insulating layer in each pixel region is smaller than that in the remaining regions, to compensate for the problem of lowering light transmission efficiency in the pixel region. In other words, both the first organic insulating layer 95 and the second organic insulating layer 97 are formed in the areas ('A' and 'D') adjacent to the data lines 94 to prevent cross-talk and data signal delay problems. Meanwhile, in the case of some light transmission areas ('B' and 'C') of the pixel region, only the second organic insulating layer 97 is formed so as to provide light transmission efficiency. Accordingly, it is possible to wholly improve the light transmission efficiency in the pixel regions while organic passivation is used to o prevent cross-talk and data signal delay problems.

Subsequently, a first contact hole 96 is formed in the first organic insulating layer 95 and in the second organic insulating layer 97 on the drain electrode 94b so that the drain electrode can be connected to the pixel electrode. Also, a second contact hole 100 is formed in the first organic insulating layer 95 and second organic insulating layer 97 above the common line 91b. The common electrodes 98 are formed on the second organic insulating layer 97 of the pixel region above the data lines 94 such that the common electrodes 98 are connected to the common line 91b through the second contact hole 100. The pixel electrodes 99 is formed on the second organic insulating layer 97 of the pixel region between the common electrodes 98. The pixel electrodes 99 are connected to the drain electrode 94b through the first contact hole 96.

When forming the common electrodes 98 above the data lines 94, the common electrodes 98 are formed to be wider than the data lines 94. Also, the common electrodes 98 of the pixel region is parallel to the data lines 94. In the aforementioned drawings, one common electrode 98 is formed between two other common electrodes 98 within one pixel region. However, it is possible to form two common electrodes between two other common electrodes 98 within one pixel region. The pixel electrodes 99 are formed between the common electrodes 98 at fixed intervals. The pixel electrodes 99 and the common electrodes 98 are formed on the same layer, such as the second organic insulating layer 97. Pixel electrodes 99 adjacent to the data lines 94 are formed along a step difference of the second organic insulating layer 97. In the case when misalignment problem occurs along the edge of the step difference of the second organic insulating layer 97 during the rubbing process, the picture quality may be deteriorated by a subsequent liquid crystal alignment failure. In this respect, the pixel electrodes 99 are formed on the edge of the step difference of the second organic insulating layer 97 so as to prevent light transmittance therethrough. That is, since the pixel electrodes 99 are formed at an area along an edge of the step difference of the second organic insulating layer 97, the area is not used as the light transmission area so that it is possible to prevent the deterioration of the picture quality resulting from a liquid crystal alignment failure. The common electrodes 98 and the pixel electrodes 99 are formed of transparent conductive metal such as indium-tin-oxide (ITO), tin-oxide (TO), indium-zinc-oxide (IZO), or indium-tin-zinc-oxide (ITZO).

Although not shown, the upper substrate is formed opposite to a lower substrate. The upper substrate includes a color filter layer corresponding to the pixel regions of the lower substrate to display various colors and a black matrix layer to prevent light leakage in portions of the lower substrate corresponding to the thin film transistors and the gate lines. Portions of the lower substrate corresponding to the data lines of the lower substrate do not require the black matrix layer, and are thus referred to as black matrix-free regions.

When forming the common electrodes 98 above the data lines 94, the common electrodes 98 are formed to be wider than the data lines 94. As a result, a black matrix layer for preventing the light leakage is not required between the data lines 94 and the common electrodes 98, thereby preventing the decrease of the aperture ratio. In other words, there is no bonding margin between the lower and upper substrates that has to be taken into consideration. Thus, the reduce usage of the black matrix by having the common electrodes 98 above the data lines 94 improves the aperture ratio.

A method of manufacturing the aforementioned IPS mode LCD device according to the preferred embodiments of the invention will be described with reference to FIG. 9A to FIG. 9D. More particularly, FIG. 9A to FIG. 9D are cross-sectional views illustrating the manufacturing process steps of the IPS mode LCD device according to an embodiment of the invention.

Figure 9A:
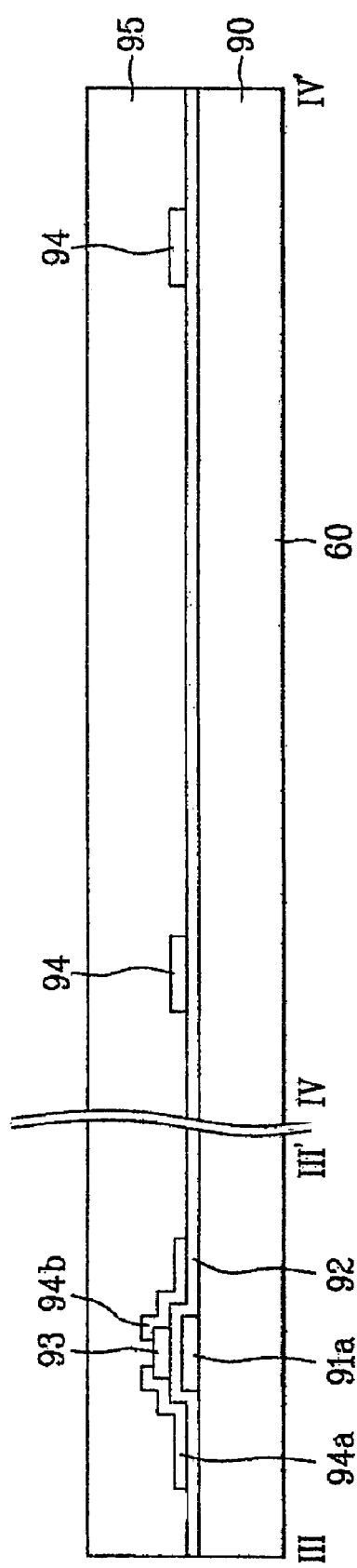
FIG. 9A to FIG. 9D are cross-sectional views illustrating the manufacturing process steps of an IPS mode LCD device according to an embodiment of the invention.

As shown in FIG. 9A, a conductive metal layer is deposited on a transparent lower substrate 90, and then patterned by photolithography to form a gate line 91 and a common line 91b. A portion of the gate line 91 serves as the gate electrode 91a. The gate line 91 is formed in parallel to the common line 91b. The conductive metal layers may be formed of any one of aluminum Al, chrome Cr, molybdenum Mo, and tungsten W. Subsequently, a gate insulating layer 92 is formed over the entire surface of the lower substrate 90 including the gate line 91 and the common line 91b. The gate insulating layer 92 may be formed of silicon nitride SiNx or silicon oxide SiO2. Then, a semiconductor layer ('amorphous silicon'+'impurity amorphous silicon') is deposited on the gate insulating layer 92, and then patterned by photolithography, thereby forming an island-shaped active layer 93 above the gate electrode 91a. A second conductive metal layer is then deposited over the entire surface of the lower substrate 90 including the active layer 93, and then patterned by photolithography, thereby forming a data line 94 crossing the gate line 91, a source electrode 94a protruding from the data line 94, and a drain electrode 94b at a predetermined interval from the source electrode 94a. In this case, the source electrode 94a and the drain electrode 94b are overlap both sides of the active layer 93. A first organic insulating layer 95 having the low dielectric constant in a range of approximately 3 to 4 is then formed over the entire surface of the lower substrate 90 including the data line 94.

Figure 9B:
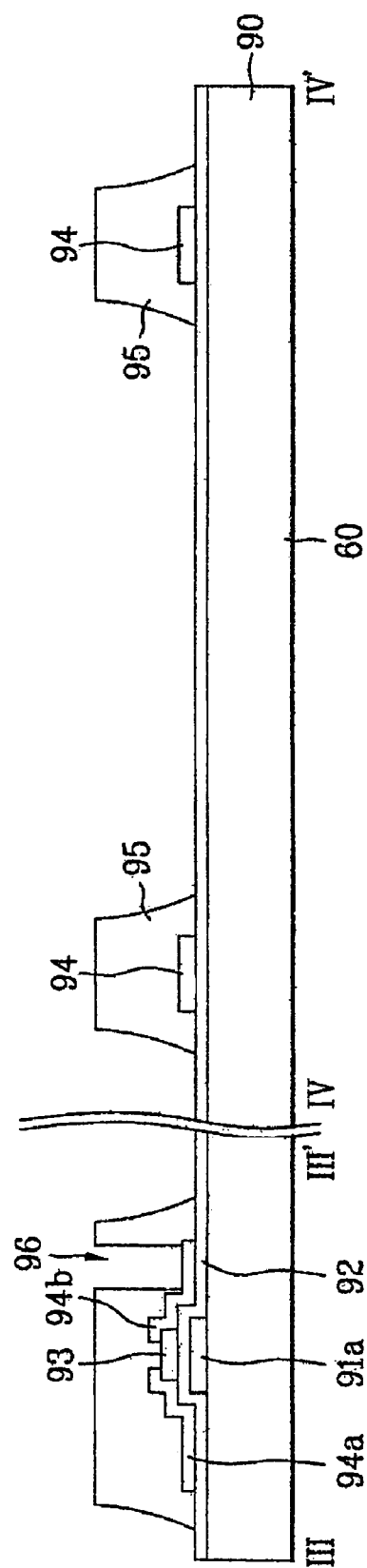

As shown in FIG. 9B, the first organic insulating layer 95 is selectively removed in the pixel region except the portions corresponding to the data line 94 and the thin film transistor region. At this time, the first organic insulating layer 95 is selectively etched on the drain electrode 94b, thereby forming the contact hole 96 exposing one portion of the drain electrode 94b.

Figure 9C:
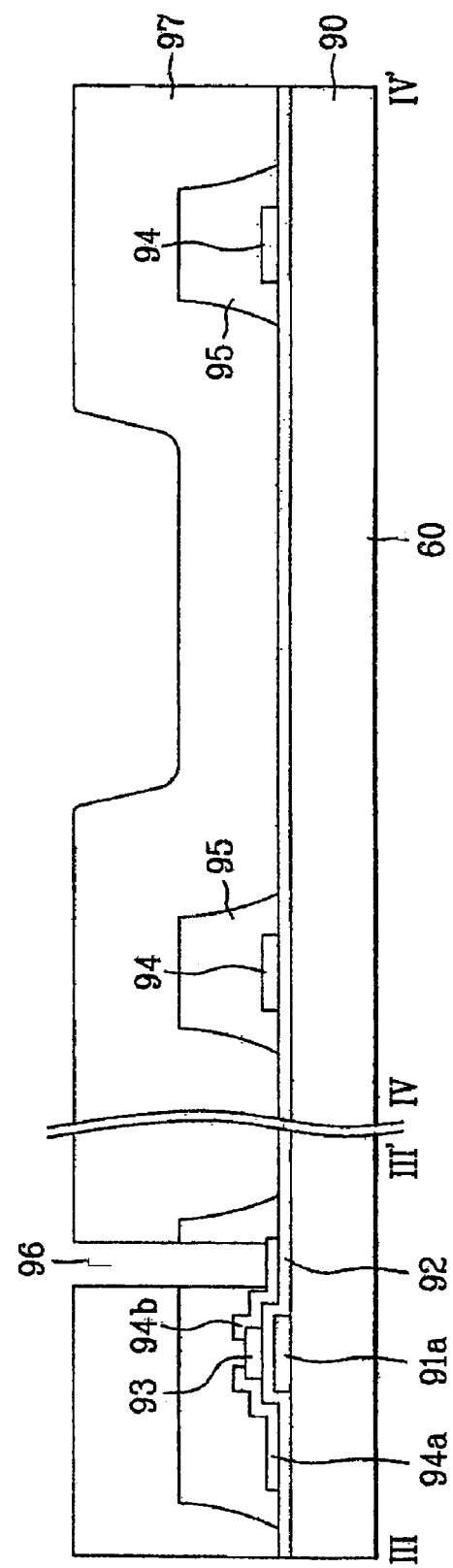

Referring to FIG. 9C, the second organic insulating layer 97 is deposited on the entire surface of the lower substrate 90 including the first organic insulating layer 95. In state of forming the first organic insulating layer 95 covering the data line 94, the second organic insulating layer 97 is deposited on the entire surface of the lower substrate 90, whereby the second organic insulating layer 97 has the step difference in the pixel region. Upon forming the first organic insulating layer 95 and the second organic insulating layer 97, some portions of the light transmission areas in the pixel region have only second organic insulating layer 97, so that these areas have a total thickness smaller than that of the remaining areas in the pixel region, thereby improving the light transmission efficiency. That is, both the first and second organic insulating layers 95 and 97 are formed in the areas ('A' and 'D') adjacent to the data lines 94 to prevent Cross-Talk and data signal delay problems. Meanwhile, in case of some light transmission areas ('B' and 'C') of the pixel region (for reference, FIG. 8 and FIG. 9D), only second organic insulating layer 97 is formed to improve the light transmission efficiency. According to this structure, it is possible to wholly improve the light transmission efficiency in the pixel regions. After that, the first organic insulating layer 95, the second organic insulating layer 97, or the gate insulating layer 92 is selectively removed by photolithography so as to expose the predetermined portion of the drain electrode 94b and the common line, thereby forming the first contact hole 96 and the second contact hole 100.

Figure 9D:
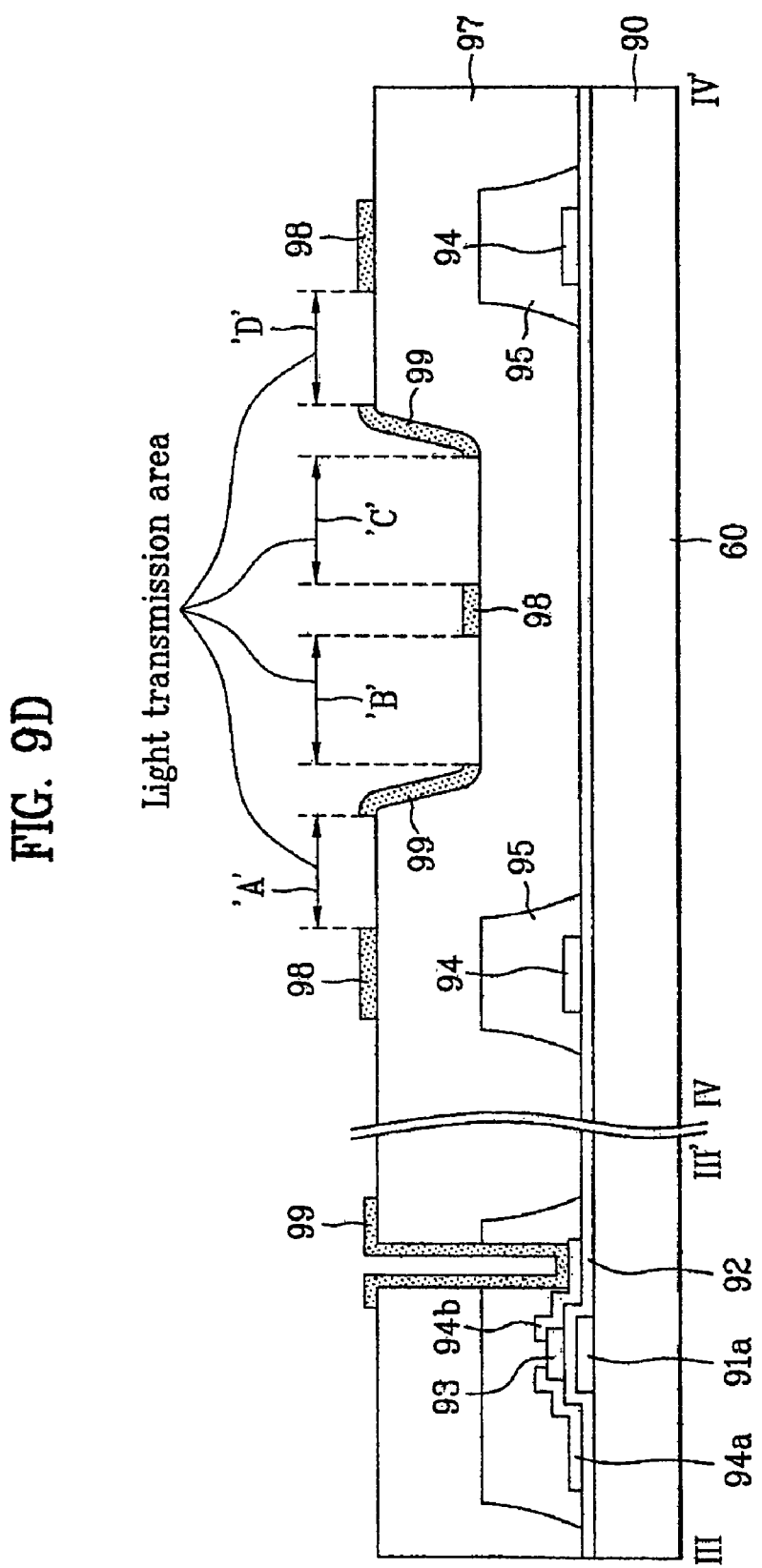

Subsequently, as shown in FIG. 9D, a transparent conductive layer is deposited on the entire surface of the second organic insulating layer 97 of the lower substrate 90 including the first contact hole 96 and the second contact hole 100, and then selectively removed by photolithography, thereby forming the common electrode 98 and the pixel electrode 99. The transparent conductive layer may be formed of indium-tin-oxide (ITO), tin-oxide (TO), indium-zinc-oxide (IZO), or indium-tin-zinc-oxide (ITZO). At this time, the common electrode 98 is connected to the common line 91b through the second contact hole 100, and formed above the data line 94 in the pixel region. Also, when forming the common electrode 98 above the data line 94, the common electrode 98 is wider than the data line 94, and the common electrode 98 of the pixel region is formed in parallel to the data line 94. In the drawings, only one common electrode 98 is formed within one pixel region. However, it is possible to form the plurality of the common electrodes 98 and the pixel electrodes 99 within one pixel region.

In this state, the pixel electrodes 99 are connected to the drain electrode 94b through the first contact hole 96, and the pixel electrodes 99 are formed in parallel to the data lines 94 between the common electrodes 98. Especially, the pixel electrodes 99 adjacent to the data lines are formed along the step difference of the second organic insulating layer 97. Also, the end of the pixel electrodes 99 overlap with one side of the common line 91b. Although not shown, an alignment layer is formed on the entire surface of the lower substrate 90 including the pixel electrodes 99 and the common electrodes 98. If the alignment layer is formed of polyimide, the alignment direction is determined by mechanical rubbing. Meanwhile, if the alignment layer is formed of the photosensitive material such as polyvinylcinnamate (PVCN)-based material or polysiloxane-based material, the alignment direction is determined by irradiation of ultraviolet rays. At this time, the alignment direction depends on light irradiation direction or light characteristics such as polarizing direction.

After that, the upper substrate (color filter substrate) having the black matrix layer, the color filter layer, and an overcoat layer is prepared. Then, the upper substrate is bonded to the lower substrate 90. Although not shown, an alignment layer is formed on an entire surface of the upper substrate, wherein the alignment layer of the upper substrate is formed of the same material as that of the lower substrate.

As mentioned above, the IPS mode LCD device and the method of manufacturing the same according to the embodiments of the invention have the following advantages. In the IPS mode LCD device according to embodiments of the invention, the total thickness of the organic insulating layer in the pixel region is smaller than that in the remaining regions, thereby improving the luminance by improving the light transmission efficiency. Further, when forming the common electrodes above the data lines, the common electrodes are wider than the data lines, whereby it is possible to solve the problem of the decrease of the aperture ratio by the bonding margin of the lower and upper substrates.

It will be apparent to those skilled in the art that various modifications and variations can be made in the embodiments of the invention. Thus, it is intended that embodiments of the invention cover the modifications and variations of this invention provided they come within the scope of the appended claims and their equivalents.

What is claimed is:
1. An in-plane switching mode liquid crystal display device comprising:
   a plurality of gate and data lines on a substrate that cross each other to define a pixel region;
   a thin film transistor at a crossing of the plurality of gate and data lines;
   an organic insulating layer over the substrate including the thin film transistor, and having a step difference in the pixel region, wherein a total thickness of the organic insulating layer in each pixel region is smaller than a thickness in a non-pixel region;
   common electrodes on the organic insulating layer above the data lines; and
   pixel electrodes positioned above the organic insulating layer and between the common electrodes, wherein the pixel electrodes in the pixel region are formed along the step difference of the organic insulating layer, and wherein the organic insulating includes:

a first organic layer covering the data lines and the thin film transistor except for the pixel region; and a second organic insulating layer over an entire surface of the lower substrate including the first organic insulating layer.

2. The in-plane switching mode liquid crystal display device of claim 1, wherein the first and second organic insulating layers are formed of a material having a dielectric constant in a range of approximately 3 to 4.

3. The in-plane switching mode liquid crystal display device of claim 1, wherein the organic insulating layer includes a contact hole exposing a portion of drain electrode of the thin film transistor.

4. The in-plane switching mode liquid crystal display device of claim 3, wherein the pixel electrode is connected to the drain electrode through the contact hole.

5. The in-plane switching mode liquid crystal display device of claim 1, wherein the common electrodes are wider than the data lines.

6. The in-plane switching mode liquid crystal display device of claim 1, wherein the common electrodes of the pixel region are formed in parallel to the data lines.

7. The in-plane switching mode liquid crystal display device of claim 1, further comprising a common line on the same layer as the gate line in parallel.

8. The in-plane switching mode liquid crystal display device of claim 1, wherein the common line and common electrodes are connected to each other within the pixel region.

9. The in-plane switching mode liquid crystal display device of claim 1, wherein the common electrode and the pixel electrode are formed of indium-tin-oxide (ITO), tin-oxide (TO), indium-zinc-oxide (IZO), or indium-tin-zinc-oxide (ITZO).

* * * * *